Feb. 13, 1934.  R. C. HOFFMAN  1,947,046
UNIVERSAL JOINT
Filed Feb. 20, 1933  2 Sheets-Sheet 1
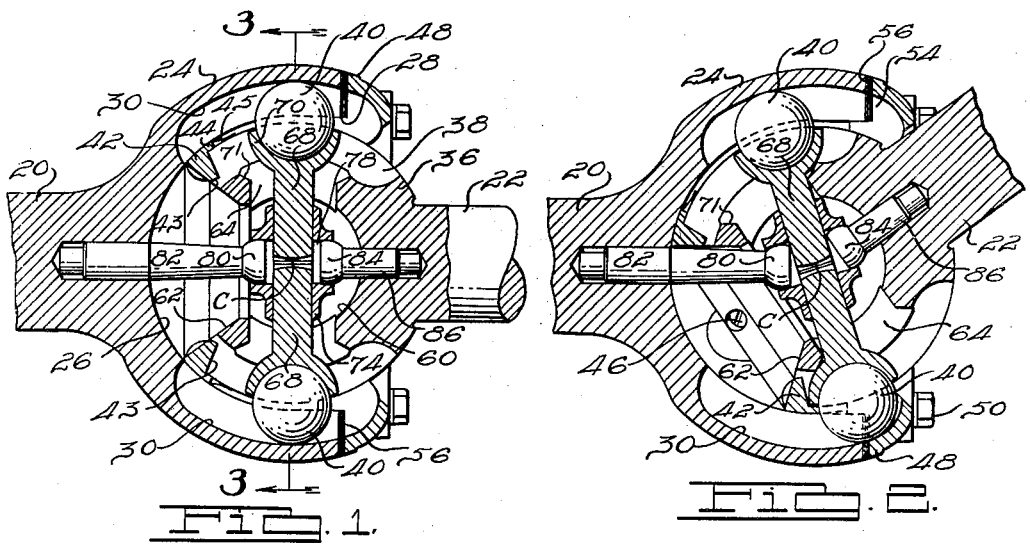
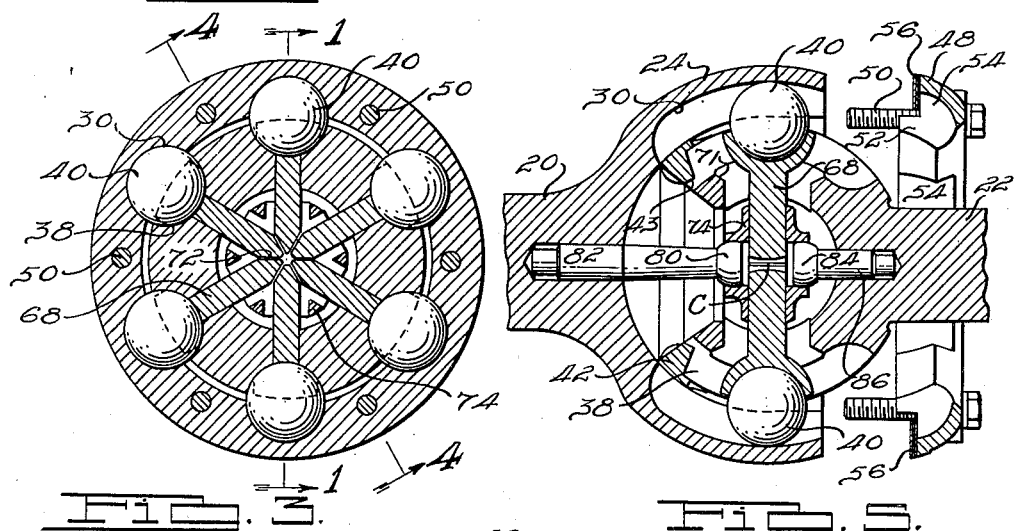
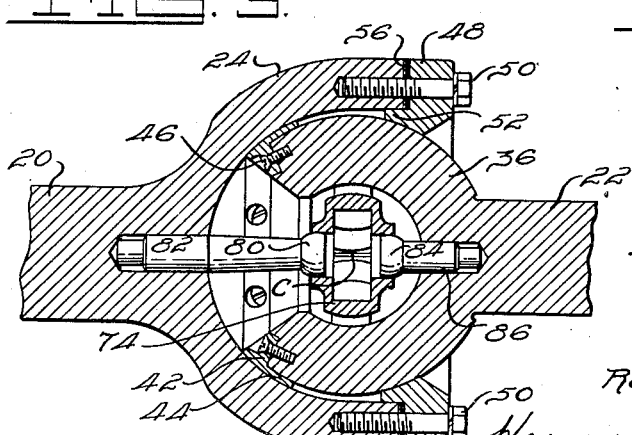
INVENTOR
Roscoe C. Hoffman.
BY
Harness, Dickey, Pierce & Hann.
ATTORNEYS.

Feb. 13, 1934.  R. C. HOFFMAN  1,947,046
UNIVERSAL JOINT
Filed Feb. 20, 1933    2 Sheets-Sheet 2
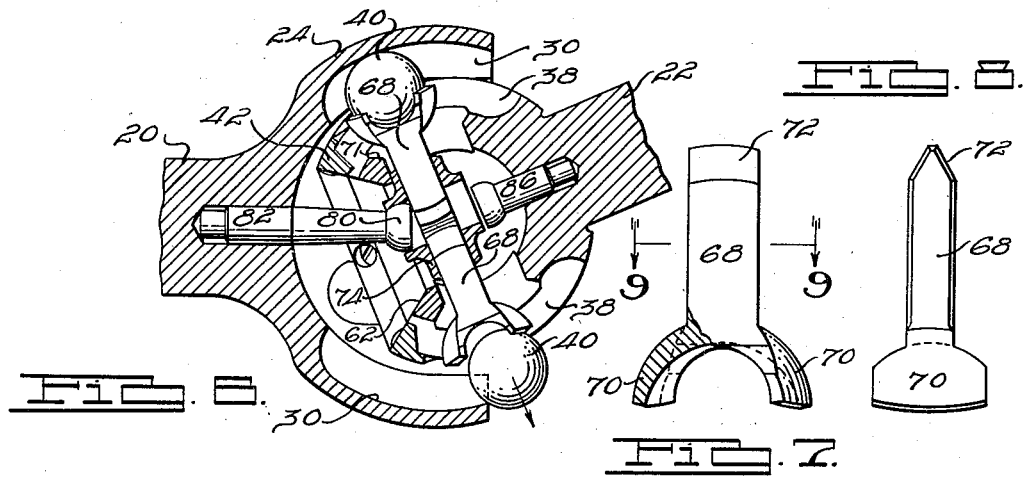
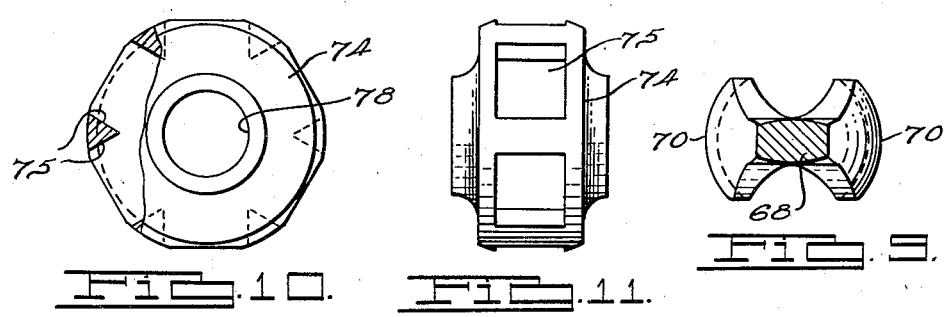
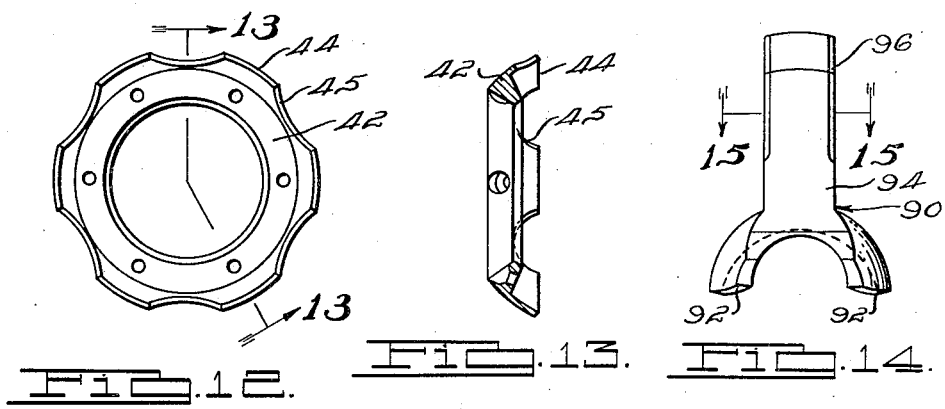
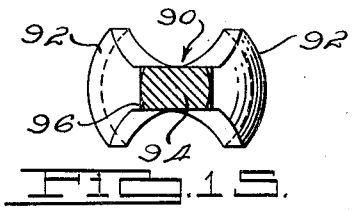
INVENTOR
Roscoe C. Hoffman.
BY
Harness, Dickey, Pierce & Hann.
ATTORNEYS.

Patented Feb. 13, 1934

1,947,046

UNITED STATES PATENT OFFICE 1,947,046

UNIVERSAL JOINT

Roscoe C. Hoffman, Detroit, Mich.

Application February 20, 1933. Serial No. 657,694

12 Claims. (Cl. 64—91)

This invention relates to universal joints and particularly to that type thereof known as a constant velocity joint characterized by the fact that a shaft which is driven through the joint does not vary in angular velocity from the driving shaft regardless of the angularity between the driving and driven shafts, the principal object being the provision of a universal joint of this type that is simple in construction, efficient in operation and particularly lends itself to ease of manufacture.

Objects of the invention are to provide a universal joint including inner and outer members having cooperating opposed spherically formed surfaces which are grooved in opposed relation in a plane passing through their respective axes and in which opposed grooves hardened balls are received for the purpose of transmitting torque from one of the members to the other thereof; to provide a joint of this type having a novel means for maintaining the inner and outer members thereof in concentric relationship; to provide a joint of this type having a novel means of taking the end thrust out of the joint; to provide a joint of this type having a novel means for maintaining torque transmitting balls in proper operative relationship with respect to both the inner and outer members; to provide a joint of this type in which the inner member is hollow and radial slots are provided in the inner member between the grooves for the balls and its hollow interior, ball guides each having one end thereof disposed in operative relation with respect to the ball in the corresponding groove extending through the slot and into the hollow interior of the inner member to there cooperate with means for moving the balls in accordance with the angularity of the joint; and to provide a joint that may be produced with a minimum amount of labor and material.

The above being among the objects of the present invention, the same consists in certain features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Figure 1 is a vertical sectional view taken centrally through the axis of my improved universal joint, as on the line 1—1 of Fig. 3, showing the position of the parts when the driving and driven shafts are in aligned relation.

Fig. 2 is a view similar to Fig. 1 but showing the position of the parts when the driving and driven shafts are angularly disposed with respect to each other.

Fig. 3 is a transverse sectional view taken on the line 3—3 of Fig. 1.

Fig. 4 is a view similar to Fig. 1 but rotated to the position indicated by the line 4—4 of Fig. 3.

Fig. 5 is a view similar to Fig. 1 but illustrates the first step of operation in disassembling, or the last step of operation in assembling, the joint shown in the previous figures.

Fig. 6 is a view similar to Fig. 5 but illustrating the second operation followed in disassembling the joint.

Fig. 7 is an enlarged partially broken side elevational view of one of the ball guide members employed in the universal joint shown in the preceding views.

Fig. 8 is an edge elevational view of the ball guide shown in Fig. 7.

Fig. 9 is a cross-sectional view taken on the line 9—9 of Fig. 7.

Fig. 10 is an end view of the guide socket member employed in the universal joint shown in Figs. 1 to 6, inclusive.

Fig. 11 is a side elevational view of the socket member shown in Fig. 10.

Fig. 12 is an end view of the nose ring employed in connection wtih the universal joints shown in Figs. 1 to 6, inclusive.

Fig. 13 is a sectional view taken on the line 13—13 of Fig. 12.

Fig. 14 is a side elevational view of a modified form of ball guide member.

Fig. 15 is a sectional view taken on the line 15—15 of Fig. 14.

Referring to the drawings, two shafts 20 and 22 are shown connected together by a universal joint, and although from a practical standpoint it makes no difference whether the main joint members are removably secured to their corresponding shafts or are formed integrally therewith, the latter condition is shown in the drawings in order to simplify the description thereof. The shaft 20 is herein considered, for the purpose of illustration only, as the drive shaft and is shown as being provided with an integral housing, cage or shell 24 of ball-like formation except that one end thereof is cut off in a plane perpendicular to the axis of the shaft 20 a short distance beyond the center of the ball. The hollow interior of the shell 24 is machined out to provide an interior surface 26 of semi-spherical formation having a center at C and lying in the axial line of the shaft 20, that portion axially beyond the center of the sphere being formed cylindrically as at 28 mainly for the purpose of ease in production.

The inner surface 26 of the shell 24 has formed therein a plurality (shown in the drawings for the purpose of illustration as six) of ball receiving grooves 30. These grooves are equally angularly spaced about the axis of the shaft 20 and each lies in a plane including the axis of the shaft 20. The grooves 30 are partially circular in cross-sectional view, as indicated in Fig. 3, and are curved longitudinally of the shaft 20 about the center C as an axis.

The driven shaft 22 is provided with a spherical end 36 of slightly smaller diameter than the surface 26 and is received within the shell 24 with its center coincident with the center C. The end 36 is provided in its outer surface with a plurality of ball receiving grooves 38 equal in number to the grooves 30 and each located in opposed relation to one of the grooves 30. Each of the grooves 38 is located in the plane including the axis of the shaft 22, each is curved longitudinally of the axis about the center C, and each is partially circular in cross section as indicated in Fig. 3 and of a radius in this section corresponding to the radius of the grooves 30. Between each pair of opposed grooves 30 and 38 a hardened ball 40, of a radius corresponding to the sectional radius of the grooves 30 and 38, is received. These balls 40 in accordance with usual practice in this type of joint are employed for transmitting the torque from one of the shafts 20 or 22 to the other thereof.

In order to maintain the ball end 36 concentric with the shell or housing 24, the inner member 36, which is cut away at its inner end as will hereinafter be more fully pointed out, is provided with an annular nose piece 42 seated against and accurately located by shoulders 43 formed on such end and, although not essential except for maintaining it in assembled relation to the ball end 36 when the joint is disassembled, the nose piece may be secured to the ball end 36 by screws such as 46 (see Fig. 4) threaded into the end 36. The outer face of the nose ring 42 is partially spherical in shape and of such a radius as to be closely received within and against surface 26 of the outer shell 24. The nose ring 42 includes an extended portion 44 which projects between the outer surface of the ball member 36 and the spherical inner surface 26 of the outer shell 24 and aids in maintaining these members in concentric relation, and the portion 44 is cut away as at 45 in line with each groove 38 to permit the balls 40 to travel the full length of the slots 38 in that direction.

A retaining ring 48 is secured to the outer end of the shell 24 by means of bolts 50 (see Fig. 4). This retaining ring 48 is provided with an inner annular extension 52 which projects into the space between the cylindrical surface 28 and the outer surface of the ball end 36 and its radially inner face is formed to conform to and closely receive the outer surface of the ball end 36. Thus the nose ring 42 and the retainer ring 48 cooperate with the outer shell 24 and the inner ball 36 to maintain them in concentric relation and, at the same time, act to transmit any axial load imposed on the joint between these members. As indicated in Figs. 1 and 2 and as particularly well brought out in Fig. 5, the grooves 30 of the outer shell 24 are extended on into the retainer ring 48 as at 54 so as to permit the balls 40 to move to the extreme outer limit of the grooves 30 in this direction during maximum angularity of the joint. In order to provide for adjustment in assembly of the joint, as well as to take up wear on the nose ring 42 and retaining ring 48, laminated or other shims 56 are provided between the retaining ring 48 and adjacent face of the shell 24 as illustrated in the various figures.

In constructions of the present type it is necessary to maintain the torque transmitting balls, which find their counterparts in the balls 40 in the present construction, in a plane which includes a line passing through the point of intersection of the axes of the driving and driven shafts and bisecting the angle formed between the axes when the joint is operated with the driven and driving shafts in angularly disposed relation with respect to each other. The mechanism provided in the instant case for this purpose will now be described. Ball member 36 is centrally recessed as at 60 preferably concentrically with respect to the outer surface thereof and this recess opens in the direction of the bottom of the shell 24 onto the angularly outwardly flared face 62 of the ball member 36 in which the shoulders 43 previously described are provided for reception of the nose member 42. The ball member 36 is provided with a relatively narrow radially extending and axially parallel slot 64 connecting the bottom of each of the grooves 38 with the recess 60 and while for smaller joints transmitting relatively low loads, the slots 64 may be extended out through the beveled end face 62 I prefer, particularly for larger joints or joints intended to transmit relatively high loads, that these slots be closed at both ends as indicated in the drawings.

Contrary to what might at first be expected, the openings of the slot 64 in the grooves 38 are of an advantage rather than a disadvantage for, although they reduce the available area of the slot 38 for contact with the corresponding ball 40, this area is reduced only at the bottom of the slots and is actually desirable due to the fact that it reduces the tendency of the balls to climb up the sides of the slot during the transmission of high torque, and which would tend to establish point contact rather than line contact between the balls 40 and their respective grooves, and not only results in greater assurance that the balls 40 will have line contact with the grooves but also results in the effective angle of pressure due to the forces being transmitted through the balls being disposed in a direction more nearly tangent to the surface of the ball 36 than would otherwise be obtained.

Slidably received in each of the slots 64 is the shank 68 of a ball guide including a head portion having opposed finger portions 70 embracing opposite sides of the corresponding ball 40 axially of the joint. As best illustrated in Figs. 7, 8 and 9, the heads of the guides are originally formed of semi-spherical formation and with the inner surface thereof formed for substantially fitting engagement with the surface of a ball 40. Opposite sides of the head are then cut away into general conformity with the cross-sectional conformation of the slots 38 so that they may slide in the slots 38 axially of the joint and yet permit the corresponding ball 40 to contact laterally of the length of the corresponding groove 38 with the sides of the groove. To provide clearance at the ends of the slots 64 for the fingers 70 at maximum angularity of the joint the outer end edges of the slots are preferably relieved as at 71.

The inner ends 72 of the shank 68 are wedge shaped in end view, as indicated best in Fig. 3, and closely approach each other at the center C of the joint as indicated in the various figures. Due to the fact that the linear distance between the centers of adjacent balls decreases as the balls roll toward one end of their corresponding slots and away from the central position indicated in Fig. 1, it is necessary to permit a slight turning of the shanks 68 of the guides in their corresponding slots 64 and, accordingly, as best indicated in the sectional view of Fig. 9, the opposite sides of the shanks 68 are convexed and the wedge shaped ends 72 are similarly convexed as indicated best in Figs. 7 and 8.

This same condition may be taken care of in another way by use of ball guides of the type shown in Fig. 14. The ball guides indicated generally at 90 in Fig. 14 have a head including fingers 92 substantially identical to the fingers 70 of the construction previously described. That portion of the shank 94 which is received within the slots 64 is left rectangular in section and of a width to be slidably received in the slots 64, and that portion of the shank adapted to be received in the socket member 74 is rounded off, as at 96, on the side edges which bear against the end walls of the openings 75 in the socket member 74, to permit relative turning movement of the shank in the openings 75 in the socket member. This permits relative movement between the ball guides and socket member to take care of the situation mentioned.

In order to maintain the central axis of all of the shanks 68 in the same plane, a socket member 74 is provided in the central opening 60 of the ball 36 and is formed with radially extending openings 75 (see Figs. 10 and 11) in which the inner ends of the shanks 68 are closely but radially slidably received. The socket member 74 is of a substantially smaller outside diameter than the diameter of the recess 60 in order to provide for radial displacement thereof as occurs when the joint is operating at an angle. The socket member 74 is provided with an axial opening 78 which is concentric with the axes of the shafts 20 and 22 when the shafts 20 and 22 are in alignment, and closely received in one end of the opening 78 in spaced relation to the center C is the ball end 80 of a pin 82 concentrically fixed in the end of shaft 20, and received in the opposite end of the opening 78 is the ball end 84 of a similar pin 86 fixed in the end of the shaft 22 in concentric relation with the axis thereof and with the center of the ball end 84 the same distance from the center C as the center of the ball end 80. The two pins 82 and 86 thus control the position of the socket member 74 radially of the center C of the joint as well as the angular relation thereof with respect to the axes of the shafts 20 and 22 and, accordingly, the angular relationship of the guide shank 68 and ball 40 with respect to the axes of the shafts.

The operation of the joint in this respect may be explained by reference to Fig. 2 in which it is assumed that the axis of the shaft 20 remains in the same relative location as indicated in Fig. 1 but the axis of the shaft 22 has been shifted angularly with respect thereto. In such a case it will be apparent that the ball 80 on the pin 82 remains unchanged in position, and inasmuch as the center C of the joint is constant this point remains unchanged. The balls 80 and 84, however, being axially spaced from the center C of the joint, it will be apparent that when the shaft 22 is moved angularly to a position as indicated in Fig. 2 the ball end 84 will be shifted laterally with respect to the axis of the shaft 20 and in shifting laterally will move the corresponding end of the socket member 74 a corresponding distance. This will cause the socket member 74 to pivot about the center of the ball 80 and, inasmuch as the centers of the balls 80 and 84 are equidistant from the center C of the joint, the socket member 74 will be tilted through an angle one-half as great as the angle through which the shaft 22 has been shifted. This then causes a corresponding shifting of the guide shanks 68, guide fingers 70 and corresponding movement of the balls 40 which brings the balls 40 into a plane which bisects the angle between the axes of the shafts 20 and 22 which, as above pointed out, is the correct position for the balls 40 during all phases of movement of the joint. This is also in accordance with the natural rolling movement of the balls 40 in the grooves 30 and 38 for, as will be apparent, if each ball 40 has a true rolling movement between its corresponding opposed grooves, the center of each ball will move at half of the speed difference of the two surfaces between which it rolls. Consequently, by this mechanism the balls 40 are sure of being maintained in their proper positions regardless of the angularity of the joint and this permits the manufacture of a joint capable of satisfactory operation through a relatively great angle.

In order to disassemble the joint the following procedure may be followed, considering the joint to be in the position indicated in Fig. 1. As illustrated in Fig. 5, the bolts 50 are first unscrewed and then the retainer ring 48 with the bolts is moved axially to the right as indicated in Fig. 5. This permits the shaft 22 and the ball end 36 to be moved to the right until the left hand end wall of the slots 64 contact with the shanks 68 of the retainers, at which time it will be apparent that the ball end 84 will have been withdrawn from the opening 78 in the socket member 74. The shaft 22 may then be tilted as indicated in Fig. 6 to a position in which one of the balls 40 may be removed. The angle of the shaft 22 is then shifted so that a second ball 40 may be removed, and this process is repeated until all of the balls 40 have been removed from the joint, at which time the ball end 36 may be completely removed towards the right from the shell 24. Upon removal of the ball end 36 from the shell 24, the retainers for the balls may be withdrawn radially from the ball end and then the socket member 74 may be withdrawn axially of the ball 36 from the recess 60. Obviously, a reversal of these operations permits assembly of the joint.

From the above it will be apparent that the shell member 24 and ball member 36 are maintained in concentric relationship by means of the nose member 42 and retainer ring 48 which member and ring also serve to transmit any axial load on the joint that may become apparent, and that therefore the balls 40 are employed solely for the transmission of torques between the two members of the joint. It will also be apparent that the balls 40 are at all times maintained in their proper angular relationship with respect to the axes of the two shafts regardless of the angularity between the axes of these shafts. By the use of this construction the outer surface of the ball 36 and the inner surface of the shell member 24 may be brought into substantially close relationship whereby to reduce the radial component of the line of force through the balls 40 in transmitting torque from one of the main members of the joint to the other thereof, and thus minimizes the bursting forces which so frequently contribute to failures in these types of joints. Furthermore, all of the parts of the joint are such as to lend themselves to ready machining which constitutes an important factor in economy in production.

With the above disclosure in mind, it will be apparent to those skilled in the art that various modifications and changes may be made in the structure disclosed, but it will be apparent that this structure is indicative only of the broad principles of the invention and, accordingly, that formal changes may be made in the specific embodiment of the invention disclosed without departing from the spirit or substance of the broad invention, the scope of which is commensurate with the appended claims.

I claim:

1. A universal joint comprising a pair of shaft sections, a shell fixed to one of said sections provided with a partially spherical inner surface, a hollow ball member fixed to the other of said sections within said shell in concentric relation therewith, the opposed surfaces of said shell and said ball member having a plurality of axially disposed opposed grooves therein, a ball received by each opposed pair of said grooves, and means for maintaining said balls in proper operative relationship including retainers each having a shank disposed radially of said ball member and projecting into the hollow interior of said ball member, opposed fingers on the outer end of each of said retainers movable in said grooves in said ball member and engageable with opposite faces of the corresponding of said balls, a socket member within the hollow interior of said ball member slidably receiving the shanks of said retainers, and means cooperating between said shell, said socket and said ball member for moving said socket member through one-half of the angle through which one of said shafts is displaced relative to the other thereof.

2. In a universal joint in combination a shaft section having a shell fixed to one end thereof, said shell having a partially spherical inner surface, a second shaft section, a ball member fixed to one end of said second shaft section concentrically with respect to said spherical surface, opposed axially extending grooves in said ball member and said shell, a ball received within each opposed pair of said grooves, said ball member being hollow and being provided with a radially extending axially disposed slot connecting the bottom of each of said grooves therein with said hollow interior, a radially extending retainer member slidably received in each of said slots with its outer end engaging opposite sides of the corresponding of said balls, means within the hollow interior of said ball member socketing the inner ends of said retainer members for longitudinal sliding movement therein, and means carried by each of said shaft sections engaging said socketing means at points equidistant from the axis of said ball member for controlling the angular relation of said socketing means with respect to the angular relation of the axes of said shaft sections.

3. In a universal joint in combination a shaft section having a shell fixed to one end thereof, said shell having a partially spherical inner surface, a second shaft section, a ball member fixed to one end of said second shaft section concentrically with respect to said spherical surface, means carried by one end of said ball member in engagement with said surface and means carried by the opposite end of said shell in engagement with said ball member for maintaining the concentricity of said ball member and said surface, opposed axially extending grooves in said ball member and said shell, a ball received within each opposed pair of said grooves, said ball member being hollow and being provided with a radially extending axially disposed slot connecting the bottom of each of said grooves therein with said hollow interior, a radially extending retainer member slidably received in each of said slots with its outer end engaging opposite sides of the corresponding of said balls, means within the hollow interior of said ball member socketing the inner ends of said retainer members for longitudinal sliding movement therein, and means carried by each of said shaft sections engaging said socketing means at points equidistant from the axis of said ball member for controlling the angular relation of said socketing means with respect to the angular relation of the axes of said shaft sections.

4. In a universal joint in combination a shaft section having a shell fixed to one end thereof, said shell having a partially spherical inner surface, a second shaft section, a ball member fixed to one end of said second shaft section concentrically with respect to said spherical surface, one end of said ball member having a pair of locating shoulders formed thereon, a ring located against said shoulders and bearing against said surface, a ring carried by the opposite end of said shell in engagement with said ball member, opposed axially extending grooves in said ball member and said shell, a ball received within each opposed pair of said grooves, said ball member being hollow and being provided with a radially extending axially disposed slot connecting the bottom of each of said grooves therein with said hollow interior, a radially extending retainer member slidably received in each of said slots with its outer end engaging opposite sides of the corresponding of said balls, means within the hollow interior of said ball member socketing the inner ends of said retainer members for longitudinal sliding movement therein, and means carried by each of said shaft sections engaging said socketing means at points equidistant from the axis of said ball member for controlling the angular relation of said socketing means with respect to the angular relation of the axes of said shaft sections.

5. In a universal joint in combination a shaft section having a shell fixed to one end thereof, said shell having a partially spherical inner surface, a second shaft section, a ball member fixed to one end of said second shaft section concentrically with respect to said spherical surface, means carried by one end of said ball member in engagement with said surface and means carried by the opposite end of said shell in engagement with said ball member for maintaining the concentricity of said ball member and said surface, opposed axially extending grooves in said ball member and said shell, a ball received within each opposed pair of said grooves, said rings being recessed in alignment with said grooves to permit movement of said balls thereinto, said ball member being hollow and being provided with a radially extending axially disposed slot connecting the bottom of each of said grooves therein with said hollow interior, a radially extending retainer member slidably received in each of said slots with its outer end engaging opposite sides of the corresponding of said balls, means within the hollow interior of said ball member socketing the inner ends of said retainer members for longitudinal sliding movement therein, and means carried by each of said shaft sections engaging said socketing means at points equidistant from the axis of said ball member for controlling the angular relation of said socketing means with respect to the angular relation of the axes of said shaft sections.

6. In a universal joint in combination a shaft section having a shell fixed to one end thereof, said shell having a partially spherical inner surface, a second shaft section, a ball member fixed to one end of said second shaft section concentrically with respect to said spherical surface, opposed axially extending grooves in said ball member and said shell, a ball received within each opposed pair of said grooves, said ball member being hollow and being provided with a radially extending axially disposed slot connecting the bottom of each of said grooves therein with said hollow interior, a radially extending retainer member slidably received in each of said slots with its outer end engaging opposite sides of the corresponding of said balls, a member within the hollow interior of said ball member having axially opposed sockets and radially slidably receiving the inner ends of said retainers, and means fixed with respect to said shell and ball member respectively moveably socketed in said sockets.

7. In a universal joint in combination a shaft section having a shell fixed to one end thereof, said shell having a partially spherical inner surface, a second shaft section, a ball member fixed to one end of said second shaft section concentrically with respect to said spherical surface, opposed axially extending grooves in said ball member and said shell, a ball received within each opposed pair of said grooves, said ball member being hollow and being provided with a radially extending axially disposed slot connecting the bottom of each of said grooves therein with said hollow interior, a radially extending retainer member slidably received in each of said slots with its outer end engaging opposite sides of the corresponding of said balls, a member within the hollow interior of said ball member having a plurality of radially disposed sockets slidably receiving the inner ends of said retainers and a pair of axially disposed sockets, a member fixed with respect to said shell having a ball end received in one of said axially disposed sockets with the center of said ball end axially coincident to the corresponding of said shaft sections and spaced from the center of said spherical surface, and a member fixed with respect to said ball member having a ball end received in the other of said axially disposed sockets, the center of the last mentioned ball end being axially coincident to the corresponding of said shaft sections and being spaced from the center of said ball end by an amount equivalent to the spacing of the first mentioned ball end from the center of said spherical surface.

8. In a universal joint in combination a shaft section having a shell fixed to one end thereof, said shell having a partially spherical inner surface, a second shaft section, a ball member fixed to one end of said second shaft section concentrically with respect to said spherical surface, opposed axially extending grooves in said ball member and said shell, a ball received within each opposed pair of said grooves, said ball member being hollow and being provided with a radially extending axially disposed slot connecting the bottom of each of said grooves therein with said hollow interior, a radially extending retainer member slidably received in each of said slots with its outer end engaging opposite sides of the corresponding of said balls, said retainer members having opposed convex surfaces within the limits of said slots permitting a limited amount of turning movement thereof in said slots, means within the hollow interior of said ball member socketing the inner ends of said retainer members for longitudinal sliding movement therein, and means carried by each of said shaft sections engaging said socketing means at points equidistant from the axis of said ball member for controlling the angular relation of said socketing means with respect to the angular relation of the axes of said shaft sections.

9. A universal joint including a pair of shaft sections having a shell provided with a partially spherical inner surface and an internally disposed ball member concentric with said surface, upon adjacent ends thereof, means associated with said shell and ball member for transmitting driving torque from one of said shaft sections to the other thereof, and means for maintaining the concentricity of said shell and said ball member including a ring on one end of said ball member and a ring on the opposite end of said shell.

10. A universal joint including a pair of shaft sections having a shell provided with a partially spherical inner surface and an internally disposed ball member upon adjacent ends thereof, means associated with said shell and ball member for transmitting driving torque from one of said shaft sections to the other thereof, and means for maintaining the concentricity of said ball member and said shell including a ring secured against radial displacement on one end of said ball member and a ring secured against radial displacement on the opposite end of said socket.

11. In a universal joint in combination a shaft section having a shell fixed to one end thereof, said shell having a partially spherical inner surface, a second shaft section, a ball member fixed to one end of said second shaft section concentrically with respect to said spherical surface, means carried by one end of said ball member in engagement with said surface and means carried by the opposite end of said shell in engagement with said ball member for maintaining the concentricity of said ball member and said surface, shims adjustably controlling the position of one of said means with respect to its supporting part, opposed axially extending grooves in said ball member and said shell, a ball received within each opposed pair of said grooves, said ball member being hollow and being provided with a radially extending axially disposed slot connecting the bottom of each of said grooves therein with said hollow interior, a radially extending retainer member slidably received in each of said slots with its outer end engaging opposite sides of the corresponding of said balls, means within the hollow interior of said ball member socketing the inner ends of said retainer members for longitudinal sliding movement therein, and means carried by each of said shaft sections engaging said socketing means at points equidistant from the axis of said ball member for controlling the angular relation of said socketing means with respect to the angular relation of the axes of said shaft sections.

12. In a universal joint in combination a shaft section having a shell fixed to one end thereof, said shell having a partially spherical inner surface, a second shaft section, a ball member fixed to one end of said second shaft section concentrically with respect to said spherical surface, means carried by one end of said ball member in engagement with said surface and means carried by the opposite end of said shell in engagement with said ball member for maintaining the concentricity of said ball member and said surface, opposed axially extending grooves in said ball member and said shell, a ball received within each opposed pair of said grooves, said rings being recessed in alignment with said grooves to permit movement of said balls thereinto, said ball member being hollow and being provided with a radially extending axially disposed slot connecting the bottom of each of said grooves therein with said hollow interior, a radially extending retainer member slidably received in each of said slots with its outer end engaging opposite sides of the corresponding of said balls, means within the hollow interior of said ball member socketing the inner ends of said retainer members for longitudinal sliding and a limited amount of turning movement therein, and means carried by each of said shaft sections engaging said socketing means at points equidistant from the axis of said ball member for controlling the angular relation of said socketing means with respect to the angular relation of the axes of said shaft sections.

ROSCOE C. HOFFMAN.